Jan. 18, 1966 E. V. CHRISTENSEN 3,230,123
METHOD AND APPARATUS FOR FORMING A TUBE OF SPIRALLY WOUND TAPES
Filed June 23, 1961 4 Sheets-Sheet 2

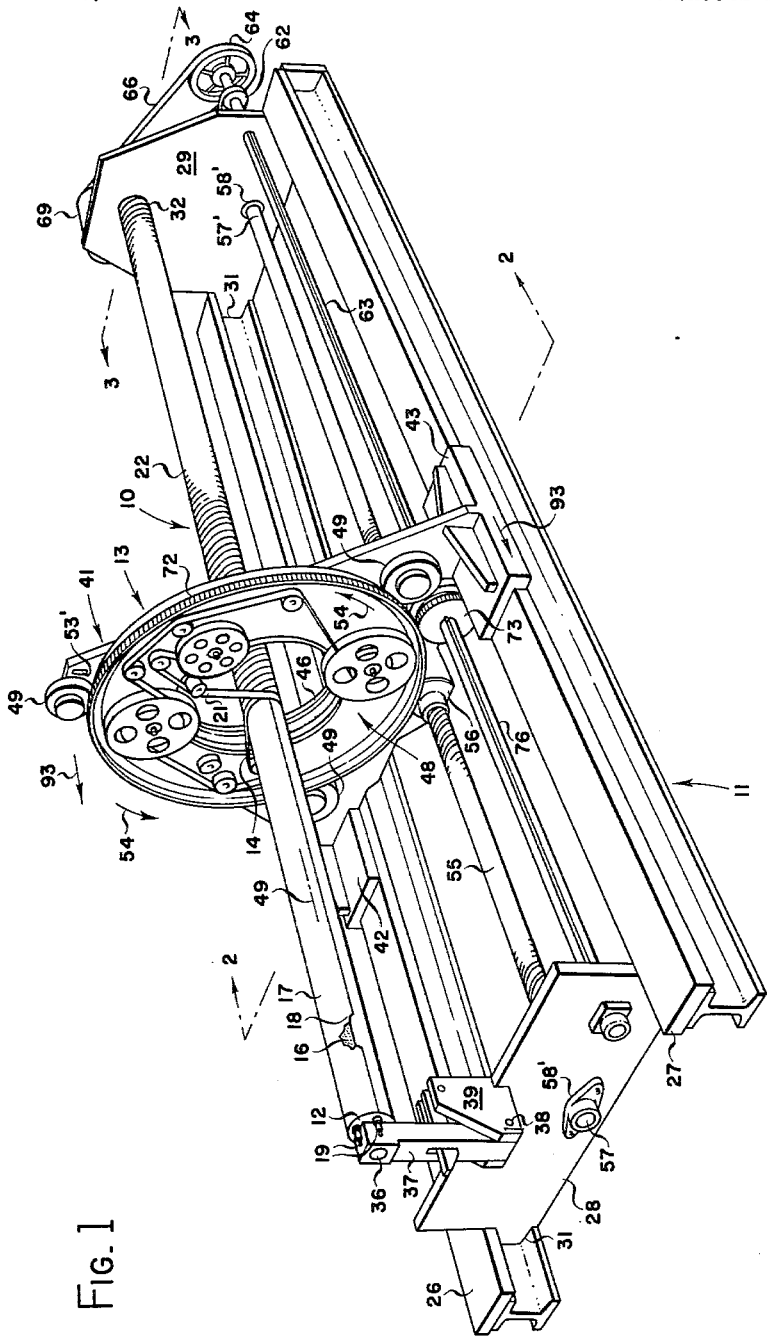

INVENTOR.
EDWIN V. CHRISTENSEN
BY
Agent

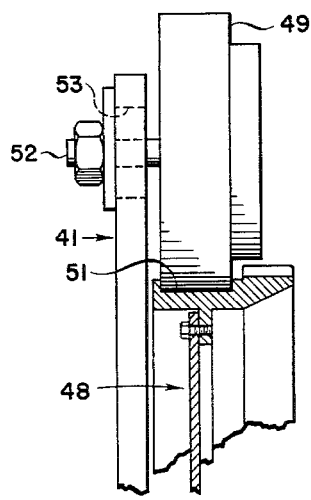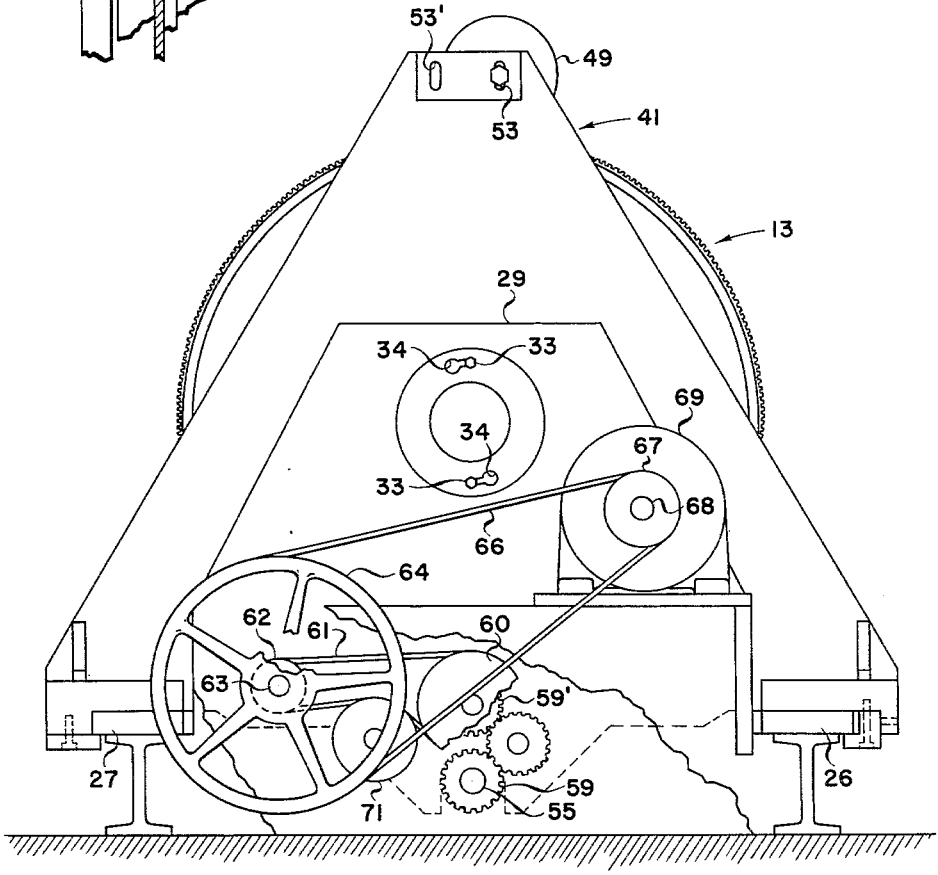

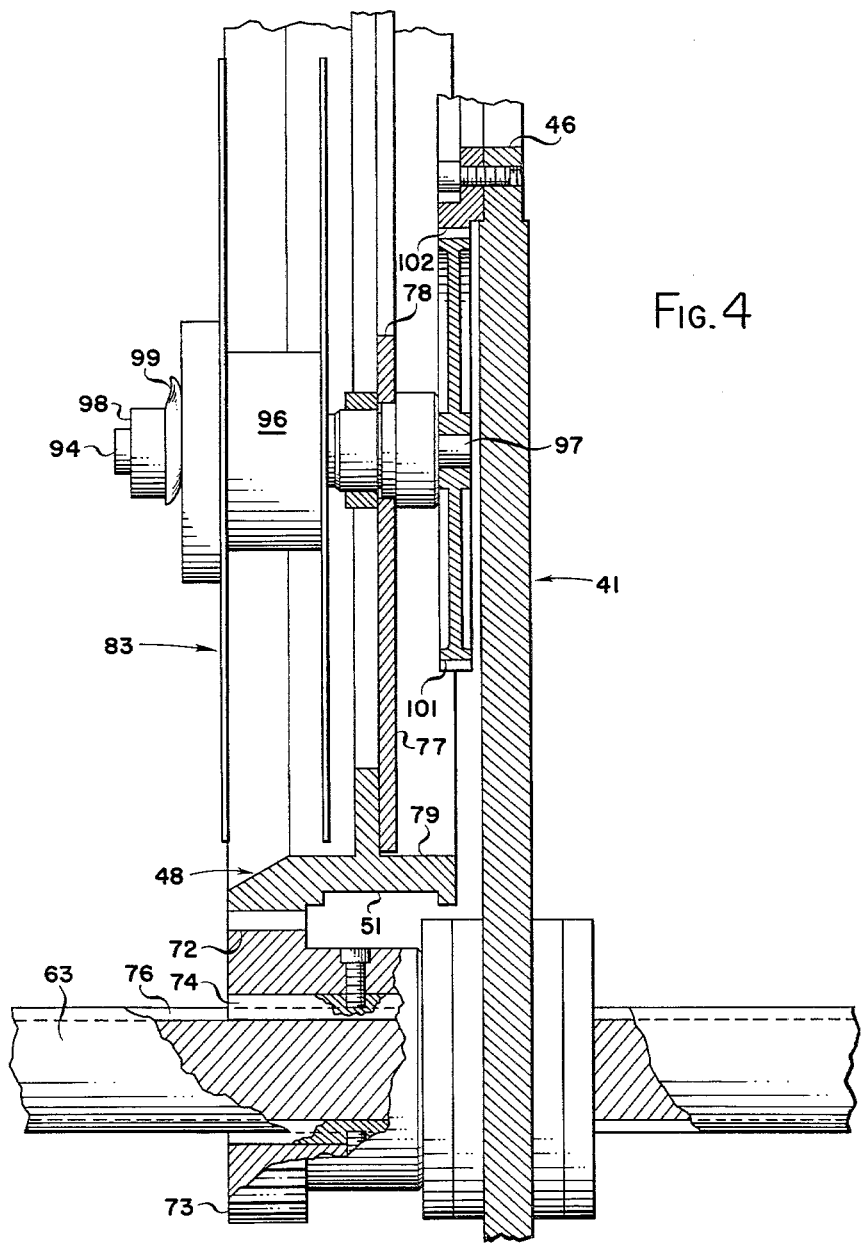

United States Patent Office 3,230,123
Patented Jan. 18, 1966

3,230,123
METHOD AND APPARATUS FOR FORMING A TUBE OF SPIRALLY WOUND TAPES
Edwin V. Christensen, Hollywood, Calif., assignor to Lockheed Aircraft Corporation, Burbank, Calif.
Filed June 23, 1961, Ser. No. 119,163
13 Claims. (Cl. 156—195)

This invention relates to a tape winding machine and more particularly to a machine for spirally winding a tape formed of a cloth, such as fiber glass, impregnated with an unpolymerized polyester resin around a mandrel for forming a tube prior to heat curing thereof.

For practicability of storing, shipping and handling, such tapes are preferably stored on spools and by virtue of the fact that the tape is, in its impregnated condition, too tacky to be wound on itself, another tape which acts as a parting agent is wound with the impregnated tape and between convolutions of the impregnated tape so as to prevent adherence of the impregnated tape to itself as it is wound on the spool. When winding the impregnated tape on a mandrel, the parting tape must be removed from between the convolutions of the impregnated tape which, in the past, has been a very cumbersome and time consuming operation. The tape winding machine of the instant invention, on the other hand, quickly and continuously removes the parting tape from the spool of impregnated tape simultaneously as the machine winds the tape on the mandrel and conveniently winds the parting tape on a separate spool so as not to interfere with the impregnated tape or with the operation of the machine. The separate spool gathers up the parting tape in a condition where it can be conveniently discarded or reused for similar purposes.

It has recently been found practical and convenient to form a tube by first applying a sleeve formed of a cloth, such as fiber glass impregnated with an unpolymerized polyester resin around a mandrel and securing the sleeve over the mandrel previously coated with a parting agent, subsequently winding a tape of cloth, such as fiber glass impregnated with an unpolymerized polyester resin spirally around the sleeve in one or more layers and afterwards heat curing the sleeve with its winding of tape to cure the resultant tube. The sleeve and spiral wrapping of tape is preferably made of substantial length and subsequently trimmed and cut to suitable usable lengths, after curing, to achieve tubes of predetermined length, which may be used in many applications.

To prevent dripping of the resin, during heat curing, a coating or layer of polymerized resin impervious material, such as the product known commercially as Mylar, a reaction product of terephthalic acid and ethylene glycol which is cast as a sheet and bilaterally stretched, or the like, is wrapped around the wound tape. For this purpose the machine provides means for winding a continuous tape of the impervious material over the last winding of the resinous tape, automatically and immediately subsequent to winding of the resinous tape.

It is therefore an object of this invention to spirally wind a continuous tape around a mandrel for forming a tube therearound.

Another object of this invention is to provide a new and improved tape winding machine which provides new and improved means for winding the tape in predetermined relationship of its convolutions.

Yet another object of this invention is to provide a new and improved tape winding machine which automatically and synchronously removes a parting tape from between convolutions of the tape to be wound on the mandrel as the tape is being wound.

It is a further object of this invention to provide a new and improved tape winding machine which provides means for automatically spirally winding a protective tape to overlie the first tape wound on the mandrel and in such manner that the leading edge of the second tape is laid rearwardly of the leading edge of the first tape.

Yet another object of this invention is to provide a new and improved tape winding machine of the character described which may be operated at high speeds to spirally wind a tape around a mandrel and which is reversible to subsequently wind the same tape or another to overlie the first layer in a reverse spiral.

A further object of this invention is to provide a new and improved tape winding machine of the character described in which the mandrel thereof is removably mounted thereto, is capable of supporting the spiral winding during subsequent heat curing of the tube formed thereon, and which includes means whereby the mandrel may be heated while the tape is being wound thereon.

A general object of this invention is to provide a new and improved tape winding machine of the character described which overcomes disadvantages of prior means and methods heretofore intended to accomplish generally similar purposes.

These and other objects of this invention will be more apparent from the following detailed description, drawings and appended claims.

In the drawings:

FIGURE 1 is a perspective view, in elevation, illustrating the tape winding machine of this invention;

FIGURE 3 is an end view as viewed substantially along the lines 3—3 of FIGURE 1;

FIGURE 4 is a cross sectional view as taken substantially along the line 4—4 of FIGURE 2;

FIGURE 5 is a cross sectional view as taken substantially along line 5—5 of FIGURE 2;

Figure 7:
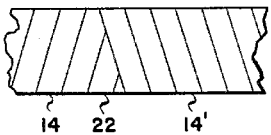
FIGURE 7 is a fragmentary plan view of the mandrel showing a reverse tape winding operation.

Referring in detail to the drawings, there is shown, by way of illustration, but not of limitation, a tape winding machine designed and constructed in accordance with this invention and generally referred to by the numeral 10. The tape winding machine 10 generally comprises a frame 11, a mandrel 12 non-rotatably supported on the frame 11 and winding means generally indicated by the numeral 13 for spirally winding a tape 14 around the mandrel 12.

In the preferred construction of a tube, in accordance with this invention, a parting agent 16 is primarily applied to the exterior of the mandrel 12, after which a sleeve 17 formed of a longitudinally split cloth, such as fiber glass or the like impregnated with an unpolymerized polyester resin, is wrapped around the mandrel 12 with longitudinal edges overlapped as at 18. Subsequently, the tape 14 is spirally wrapped in a manner to be hereinafter described to form a layer overlying the sleeve 17. The tape 14 is preferably formed of a cloth, such as fiber glass, impregnated with a polymerized polyester resin which is inherently tacky on its outer surfaces and adheres readily to the sleeve 17 surrounding the mandrel 12. The mandrel 12 is preferably hollow in construction having closed ends and inlet valves 19 for admission and/or exhaust of steam or other heat to preheat the mandrel 12 to a desired temperature compatible with the material being applied thereto.

Simultaneously with the winding of the tape 14 and subsequent thereto, a second tape of polymerized material, as indicated by the numeral 21, is spirally wrapped to overlie the tape 14 to prevent the resin from the tape 14 and the sleeve 17 from dripping from the mandrel 12 while the combination thereof is being subsequently heat cured.

The valves 19 provide convenient access for increased heat applied to the interior of the mandrel 12 for curing of the tube 22 formed thereon. In practice, the tape 14 is approximately one and a half inches wide and is wound within a range of abutting relationship of its edges to $\frac{1}{32}$ of an inch overlap. The second tape 21 is preferably approximately two inches wide and completely overlaps the first tape 14 to prevent dripping of resin during cure. However, to prevent interleafing of the second tape between windings of the first tape 14, means, to be hereinafter described, are preferably provided for causing the second tape 21 to overlap the first tape 14 so that a leading edge of tape 21 is rearward at all times of the leading edge of the tape 14. The tape 21 is eventually peeled from the tube 22 after heat curing. The mandrel is preferably preheated to a temperature range of 160 to 180 degrees Fahrenheit while winding and to 240 degrees to 260 degrees F. for curing, as by steam heat or the like, whereas cold water may be applied for cooling and air pressure applied for removing of the cooling water.

The frame 11 comprises a pair of spaced parallel longitudinal rails 26 and 27 held together in spaced relationship by a pair of upright transverse webs 28 and 29, as by welding, or the like, indicated at 31. The webs 28 and 29 are joined to the rails 26 and 27 adjacent to the outer ends of the rails and form vertical support means for removably supporting the mandrel 12. The rearward end 32 of the mandrel 12 is removably supported in the web 29 by suitable means, such as screws 33 extending in bayonet slots 34 of the web 29, whereas the forward reduced end 36 of the mandrel 12 is removably supported in a clamp 37 which is pivotally supported as at 38 to a bracket 39 fixed on the forward web 28. To remove the mandrel 12, the forward support 37 is unfastened from the end 36 on the mandrel and pivoted outwardly to release the end 36 after which the mandrel 12 may be rotated to release the screws 33 from the bayonet slots 34.

The tape winding means 13 includes a triangular, or otherwise configurated, movable web 41 which is longitudinally slidable relative to the tracks 26 and 27 of the frame 11 by virtue of sliding support of the web 41 on the tracks 26 and 27. The web 41 includes a pair of feet 42 and 43 resting on the rails 26 and 27, respectively, for linear movement relative to the longitudinal axes of the rails. Adjustable hook elements 44 are preferably provided to accurately align the feet 42 and 43 relative to the rails 26 and 27. The web 41 is provided with a clearance opening 46 through which the mandrel 12 extends when positioned on the frame 11 so as to position the web 41 circumjacent to the mandrel.

An annular collar, generally designated by the numeral 48, is rotatably mounted on the web 41 for rotation substantially concentric to the longitudinal axis 49 of the mandrel 12. The annular collar 48 is rotatably supported on a plurality of circumferentially and equally radially spaced rollers 49 rotatably mounted on the web 41 and engaging an annular groove 51 of the annular collar 48. A pair of lowermost rollers 49 are rotatable on fixed stub shafts fixed to the web 41 whereas the third or uppermost roller 49, as best seen in FIGURE 5, is adjustably mounted on a shaft 52 extending through a radial slot 53 of the web 41. An additional slot 53' is provided adjacent to the slot 53 in which the uppermost roller 49 may be optionally mounted if desired. The slots 53 and 53' are arranged one on each side of a vertical axis extending through the longitudinal axis 49. When the annular collar is adapted to rotate in a counterclockwise direction, as indicated by the arrowed lines 54, the uppermost roller 49 is arranged in the slot 53 to act additionally as a thrust bearing. For continual rotation of the annular collar 48 in an opposite direction, the roller 49 is preferably arranged in the slot 53' to serve more advantageously as a thrust bearing.

Means are provided for rotating the annular collar 48 about the axis 49 while moving the web 41, and consequently the annular collar 48, linearly along the axis 49 of the mandrel 12 for a purpose to be hereinafter described. An externally screw threaded shaft 55 having its axis of rotation substantially parallel to the axis 49 of the mandrel 12 threadedly engages a nut assembly 56 secured to the web 41 and has its opposite ends 57 and 57' supported in bearings 58 and 58', respectively, of the forward and rearward webs 28 and 29, respectively. By virtue of the threaded engagement of the shaft 55 with the nut 56, the web 41 is linearly movable along the axis of the shaft, as guided by the rails 26 and 27, in response to rotation of the shaft 55.

The shaft 55, as best seen in FIGURE 3, has a gear 59 secured to the end 57' which extends outwardly and rearwardly of the web 29. The gear 59 is meshed with a similar gear 59' which is driven by a pulley 60. The pulley 60 is driven in turn by a timing belt connection 61 to a pulley 62 rotatable with a splined shaft 63 which is keyed to an enlarged pulley 64 driven through a pulley belt 66 by a driven pulley 67 secured to the shaft 68 of a power drive means 69 in the form of an electrical motor or the like. An idler pulley 71 is preferably provided adjustably mounted relative to the belt 61 for adjusting the tension of the timing belt 61. In this manner, as the power drive means 69 is actuated, the shaft 55 is rotated at a predetermined speed to protract or retract the web 41 and thereby the annular collar 48 in a linear direction parallel to the axis 49 of the mandrel 12, depending on the direction of drive of the motor 69. The motor 69 is preferably of the type with suitable controls for reversal thereof, whereby the web 41 may be selectively driven or protracted or retracted as desired. Optionally, suitable gearing (not shown) may be provided and shiftable or actuatable to selectively reverse the direction of linear movement of the web 48.

Synchronous with the linear movement of the web 41 is the rotation of the annular collar 48. For this purpose, the annular collar 48 is provided with a ring gear 72 formed integrally with the periphery thereof or optionally secured thereto, the teeth of the gear 72 being meshed with a spur gear 73 rotatably mounted on the web 41 and having a non-rotatable but slidable engagement with the splined shaft 63. A pair of opposed keys or splines 74 are fixed in the spur gear 73 and engaged with the spline grooves 76 of the shaft 63, whereby the gear 73 is slidable relative to the shaft 63 yet is rotatable in response to the rotation of shaft 63 when driven by the motor 69 in the manner described above.

It will be now more clearly understood by the foregoing description, that in response to actuation of the power drive means 69, the shafts 55 and 63 are rotated in synchronized speed, the web 41 being movable linearly relative to the axis 49 in response to the rotation of the screw shaft 55 and the annular collar 48 being rotatable in response to rotation of the spline shaft 63 and thereby the spur gear 73 enmeshed with the ring gear 72 of the annular collar. The annular collar 48 is preferably formed of an annular ring 77 having an inner opening 78 of substantially the same or larger diameter than the diameter of the opening 46 and a rim 79 secured therewith. The rim 79 is formed with the annular groove 71 and the external peripheral ring gear 72 for convenience of manufacture. It is to be understood however that the annular web 77 and rim 79 may be formed integrally if desired.

As described above, spool means are provided for supporting a spool of tape formed of a fiber glass, or other cloth, impregnated with an unpolymerized polyester resin to revolve around the axis 49 of the mandrel 12 so as to successively and spirally wind the tape around the mandrel. The tape 14, as previously mentioned, is initially wrapped in spool form with the parting tape in between each convolution of tape so as to keep the tape 14 from sticking to itself, being quite tacky in its impregnated state.

For this purpose, a first spool means 81 is rotatably mounted on the annular collar 48 supporting the tape 14 which is wound together with the parting tape, designated by the numeral 82. A second spool means 83 is rotatably mounted on the annular collar 48 for taking up the parting tape 82 in a manner to be hereinafter described. A third spool means 84 is rotatably mounted on the annular collar 48 for supplying the polymerized tape 21, such as cellophane or the like, for spirally winding of the tape 21 over the tape 14 in a manner to be hereinafter described. The spool means 81, 83 and 84 being mounted on the annular collar 48 are caused to revolve around the axis 49 of the mandrel 12 in response to rotation of the annular collar 48.

The first spool means 81 is rotatable on a stub shaft or pin 86 extending through the hub thereof and is adjustably secured thereto as by a nut 87 and a resilient leaf or other spring 88. The tape 14 is led off the spool 81 over a guide roller 89, a subsequent guide roller 91 adjustably secured to the annular collar 48, a third guide roller 92 and finally has its free end adhered to the sleeve 17 which is secured over the mandrel 12 as previously described. Thereby, as the annular collar 48 is rotated counter clockwise, as indicated by the arrowed line 54, the tape 14 is continually wound over the sleeve 17 upon the mandrel 12 which is held stationary on the frame 26. By virtue of the fact that the annular collar 48 is simultaneously linearly moving in a path parallel to the axis 49, as indicated by the arrowed line 93, the tape 14 is laid spirally on the mandrel 12. The ratio of the drive of the screw shaft 55 and the splined shaft 62 is preferably such as to spirally wind the tape 14 in a range of between edge-to-edge abutting relationship and 1/32 of an inch overlap.

The second spool means 83 is similarly rotatably disposed on the annular collar 48 so as to rotate around a stub shaft or pin 94 fixed to the annular collar 48. The shaft 94 extends through a hub 96 of the spool 83 and has an outer end 97 extending rearwardly from the web 77 of the collar 48. The spool means 83 is adjustably secured on the shaft 94 by a nut 98 and resilient spring washer 99 to adjust the tension of the spool 83 so as to adjust the relative rotation of the spool on the shaft. The spool 83 is driven in response to rotation of the annular collar 48. For this purpose, a planetary gear 101 is secured to the outer end 97 of the shaft 94, the gear 101 being enmeshed with a ring gear 102 secured to the web 41 so that the gear 101 revolves around the gear 102 when the collar 48 rotates, and thereby causes the shaft 94 and the spool 83 to rotate in a counter clockwise direction indicated by the arrowed line 103. The free end of the parting tape 82 is secured to the hub 96 of the spool 83, the tape 82 passing over a series of guide rollers 104 from the spool means 81. By effective gearing ratio of the gears 101 and 102, the spool 83 is driven at a speed sufficient to strip the tape 82 from the spool 81 at a proper speed ratio relative to the speed of rotation of the spool 81. By virtue of the slip clutch effect of the spring 99 as retained by the nut 98 and bearing against the spool 83 mounted for rotation upon the shaft 94, the speed of the spool 83 is adjusted as the tape 82 builds up on the hub 96.

It will now be more clearly understood by the foregoing description, that as the tape 14 is stripped from the spool 81 and spirally wound on the mandrel 12, over the sleeve 17, the parting tape 82 initially assembled between convolutions thereof is taken up by the reel 83, wound thereon and is stored on the reel until disposed of.

The third spool means 84, as previously mentioned, supports a supply of polymerized tape 21 such as cellophane or the like, which is spirally wound on the mandrel 12 to overlie the tape 14. The spool means is rotatably mounted in adjustable manner on an annular collar 48 similarly to the reels 81 and 83, for rotation around a stub shaft 106. The tension of the reel 84 is adjustable as by a nut 107 and spring washer 108.

Figure 6:
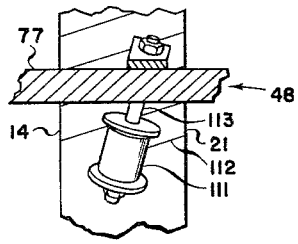
FIGURE 6 is a fragmentary cross sectional view as taken substantially along line 6—6 of FIGURE 2.
Figure 2:
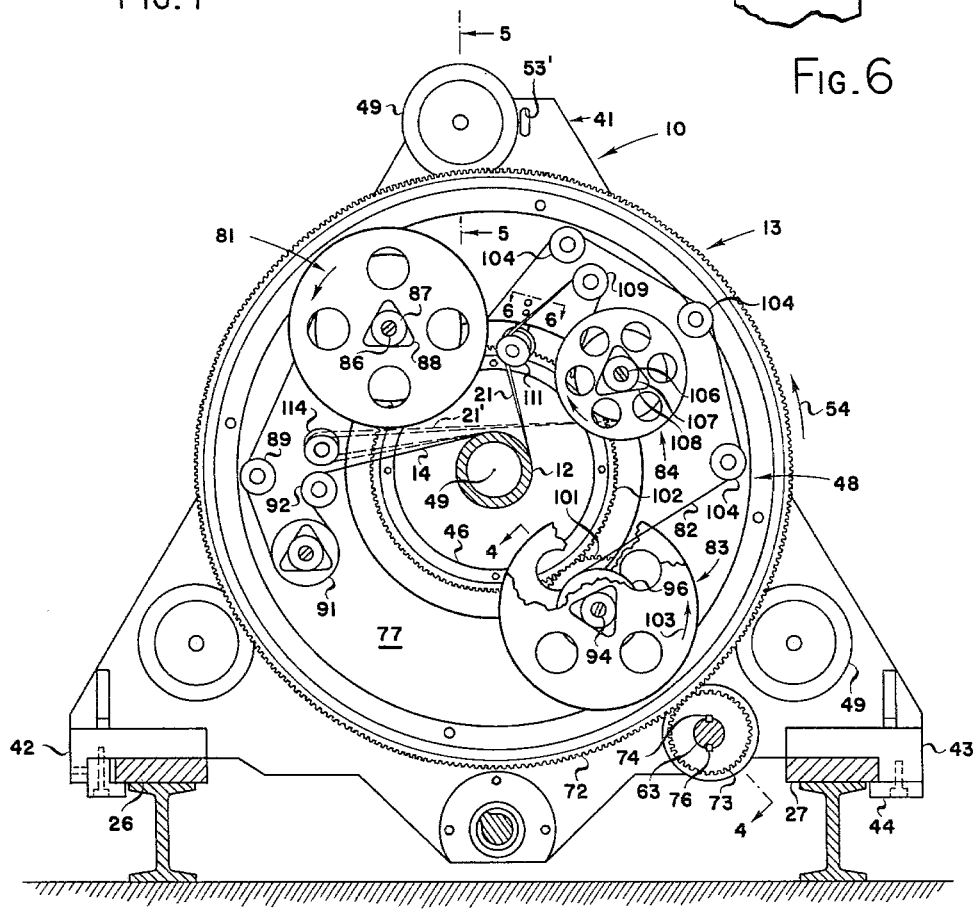
FIGURE 2 is a vertical cross sectional view as taken substantially along the lines 2—2 of FIGURE 1.

The tape 21 extends from the spool 84 over a first idler guide roller 109, a second guide roller 111 and has its free end secured on the mandrel 12, overlying the tape 14. As the annular collar 48 rotates, the tape spool 84 revolves around the mandrel 12 to spirally wind the tape 21 over the tape 14 immediately following the winding of the tape 14 on the mandrel 12. To prevent overlapping of the tape 21 over the leading edge of the tape 14, whereby the tape 21 would be apt to be sandwiched at the edge by the tape 14 on its next wind, the last guide roller 111, as best seen in FIGURE 6, is angularly mounted relative to the web 77 of the annular collar 48 in a direction to cause the tape 21 to be wound a short distance rearwardly of the leading edge 112 of the tape 14. The guide roller 111 is rotatably mounted on a stub shaft 113 angularly disposed relative to the web 77.

In the event that it is desired to wind more than one layer of the tape 14, the tape 21 is omitted on the primary winding. Subsequent layers of tape 14 are preferably wound in a reverse direction of spiral relative to the preceding layer of tape 14 as illustrated in FIGURE 7. For this purpose, the initial wrapping of tape 14 is done as previously described, with the parting tape 82 removed and gathered on the spool 83. When the web 41 has been linearly moved to the end of its forward travel, the line of travel of the web 41 is reversed to travel in a reverse direction, toward the rear web 29. Subsequent layers may be applied in the same manner. The tape 14 is automatically spirally wound due to the ratio of the linear movement of the web 41 relative to the rotation of the annular collar 13, in both directions. The tape 21 is wound over the last applied layer of tape 14 and is wound merely for the purpose of containing the resin of impregnated tape 14 during curing of the tube 22. The tape 21 is applied in the manner previously described on application thereof during forward travel of the annular collar and web 41 in the direction indicated by the arrowed line 93. If the tape 21 is to be applied during a reverse line of travel, the tape 21 is fed over an idler spool indicated by the numeral 114, which, as indicated by the broken line representation of the tape at 21', feeds the tape onto the mandrel 12 with a retarding effect to keep the tape 21 from overlapping the leading edge 112 of the tape 14 in the reverse direction. For this purpose, the guide roller 114 is angularly mounted relative to the annular collar 48 in reverse angular relationship of the roller 111. At the completion of the winding of the tape 14 and the subsequent simultaneous winding of the tape 21, the tapes 14 and 21 are cut off and secured to the mandrel 12, more particularly the sleeve 17, after which the mandrel 2 is removed from the frame 11 to a curing station, not shown. At the curing station, the nozzles 19 are utilized to admit steam or other heat at the curing temperature to the interior of the mandrel 12 to cure the tube 22 after which the tape 21 is peeled off. The spool 83 may be removed and the tape 82 discarded or stored for reuse if desired.

FIGURE 7 illustrates a tube 22 having one layer of tape 14 spirally wound thereon and a second layer of tape indicated by the numeral 14' overlapping the first layer in a reverse spiral.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed is:

1. A method of forming a tube which comprises the steps of: applying a parting agent to a stationary mandrel; wrapping a layer formed of impregnated unpolymerized polyester resin around said mandrel means and said parting agent; revolving a spool of tape formed of impregnated unpolymerized polyester resin having an end adhered over and fixed with respect to said mandrel around said mandrel means; and continuously advancing said spool along the longitudinal axis of said mandrel means while revolving the spool therearound.

2. A method as defined in claim 1, including the step of revolving a second reel having the free end of a parting tape of said first reel secured thereto around said mandrel means simultaneously with said first spool and rotating said second spool in a direction to take up said parting tape as it is stripped from said impregnated tape of said first spool.

3. The method as defined in claim 2, including the step of revolving a third spool of tape formed of resin impervious polymerized material around said mandrel simultaneously with said first spool so as to overlie said first mentioned tape subsequent to winding thereof on said mandrel.

4. A tape winding machine comprising:
 frame means;
 mandrel means non-rotatably supported on said frame means;
 means for spirally winding a tape formed of a cloth impregnated with an unpolymerized polyester around said mandrel, said means including spool means adapted to support and dispense said tape when a free end thereof is adhered over and fixed with respect to said mandrel means;
 a parting tape being wound upon said spool means between successive layers of the tape;
 means supporting said spool means for revolution around said mandrel means;
 second spool means similarly supported for revolution about said mandrel means with said first mentioned spool means;
 means for translating the revolution of said second spool means around said mandrel means into rotation of said second spool means in a direction to take up the parting tape;
 guide means supported for revolution around said mandrel for removing said parting tape from said first mentioned spool means and winding said parting tape upon said second spool means; and
 means for axially and reciprocably moving both said spool means relative to the longitudinal axis of said mandrel means while both said spool means are revolving around said mandrel means, whereby the resin impregnated tape is dispensed from said spool means and wound over said mandrel means as said spool means are moved in either reciprocable direction.

5. A machine as defined in claim 4, including adjustable clutch means on each said spool means for adjusting rotation thereof.

6. A machine as defined in claim 4, including clutch means associated with second spool means and said translating means for governing speed of rotation of said second spool means while revolving around said mandrel means.

7. A machine as defined in claim 4, including means for spirally winding a third tape formed of a polymerized material to overlap said first mentioned tape, said last mentioned means including third spool means supported for revolution around the longitudinal axis of said mandrel simultaneous to revolution of said first and second spool means and adapted to support said third tape with a free end thereof adhered over and fixed with respect to said mandrel means.

8. An apparatus for forming a tube comprising: first frame means; mandrel means non-rotatably supported on said frame means and adapted to support a sleeve formed of cloth impregnated with an unpolymerized polyester resin adhered over and fixed with respect to said mandrel means over a parting agent; means for spirally winding a tape formed of a cloth impregnated with an unpolymerized polyester resin around said mandrel means, said means including: second frame means movably supported on said first frame means for axial movement relative to said mandrel means, an annular collar rotatably supported on said second frame means and circumjacent to said mandrel means for axial movement with said second frame means and for rotation around the axis of said mandrel means, power drive means, power translating means connecting said power drive means and said annular collar and said second frame for translating power of said drive means into simultaneous rotation of said annular collar and axial movement of said second frame means in both axial directions; and spool means mounted on said annular collar for movement therewith so as to revolve around said mandrel means in response to rotation of said collar, said spool means being adapted to support said tape with a free end thereof adhered over and fixed with respect to said mandrel means.

9. An apparatus as defined in claim 8, wherein said spool means is rotatably mounted on said annular collar for rotation around an axis substantially parallel to the axis of said mandrel means.

10. An apparatus as defined in claim 8, wherein said first mentioned tape is wound on said spool means with a parting tape wound between layers thereof and wherein second spool means is supported for revolution around said mandrel means with said first mentioned spool means and adapted to have a free end of said parting tape secured thereto, and means for translating revolution of said second spool means into rotation of said second spool means in a direction to take up the parting tape, and guide means supported for revolution around said mandrel whereby said parting tape is removed from said first mentioned spool means and wound upon said second spool means.

11. An apparatus as defined in claim 10, including means for spirally winding a third tape formed of a polymerized material to overlap said first mentioned tape, said means including third spool means rotatably secured on said annular collar for movement therewith to revolve around said mandrel means and adapted to support said third tape with a free end thereof adhered over and fixed with respect to said mandrel means.

12. An apparatus as defined in claim 11, wherein said third spool means is mounted for rotation about an axis of rotation having a non-parallel relationship to the axis of said mandrel means whereby the leading edge of said third tape is wound rearwardly of the leading edge of said first mentioned tape.

13. An apparatus as defined in claim 8, including means reversing said means for spirally winding said tape on said mandrel means so as to overlie said first winding of said tape with a reverse spiral.

References Cited by the Examiner

UNITED STATES PATENTS

| Re. 25,457 | 10/1963 | Lewis et al. | 156—425 |
|---|---|---|---|
| 2,537,126 | 1/1951 | Francis. | |
| 2,733,753 | 2/1956 | Schlesselman et al. | 242—11 XR |
| 2,760,896 | 8/1956 | Nash | 156—184 |
| 2,782,833 | 2/1957 | Rusch | 156—425 |
| 2,804,907 | 9/1957 | Casey et al. | 156—195 XR |
| 2,887,150 | 3/1959 | Wilson | 156—195 XR |

EARL M. BERGERT, *Primary Examiner.*